United States Patent
Sjödin

(10) Patent No.: US 9,722,816 B2
(45) Date of Patent: Aug. 1, 2017

(54) PRECODING IN FASTER-THAN-NYQUIST COMMUNICATIONS

(71) Applicant: Telefonaktiebolaget L M Ericsson (PUBL), Stockholm (SE)

(72) Inventor: Martin Sjödin, Göteborg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 174 days.

(21) Appl. No.: 14/423,017

(22) PCT Filed: Feb. 18, 2015

(86) PCT No.: PCT/EP2015/053442
§ 371 (c)(1),
(2) Date: Feb. 20, 2015

(87) PCT Pub. No.: WO2016/131484
PCT Pub. Date: Aug. 25, 2016

(65) Prior Publication Data
US 2016/0365992 A1    Dec. 15, 2016

(51) Int. Cl.
*H03C 3/00* (2006.01)
*H04L 27/00* (2006.01)
(Continued)

(52) U.S. Cl.
CPC ..... *H04L 25/03006* (2013.01); *H04B 7/0456* (2013.01); *H04L 25/03343* (2013.01);
(Continued)

(58) Field of Classification Search
USPC ...... 375/219, 220, 240.26–240.27, 267, 278, 375/284, 285, 296, 299, 316, 324, 326,
(Continued)

(56) References Cited

U.S. PATENT DOCUMENTS

2004/0141568 A1*  7/2004  Huat ................. H04L 25/03012
                                                    375/295
2005/0047323 A1*  3/2005  Clarkson ............. H04L 27/2627
                                                    370/203
(Continued)

FOREIGN PATENT DOCUMENTS

WO       2013159207 A1    10/2013

OTHER PUBLICATIONS

International Search Report and the Written Opinion of the International Searching Authority dated Oct. 16, 2015, in International Application No. PCT/EP2015/053442, 12 pages.
(Continued)

*Primary Examiner* — Linda Wong
(74) *Attorney, Agent, or Firm* — Rothwell, Figg, Ernst & Manbeck, P.C.

(57) ABSTRACT

There is provided a method for processing a set of input symbols. The method is performed by a transmitter. The method comprises acquiring a set of input symbols. The method comprises generating a set of precoded symbols from the set of input symbols by subjecting the set of input symbols to a coding vector. The method comprises generating a transmission signal comprising a sequence of pulse forms from the set of precoded symbols by pulse shaping the set of precoded symbols. The coding vector is based on a model vector modelling intersymbol interference experienced by the pulse forms.

23 Claims, 5 Drawing Sheets

(51) Int. Cl.
    *H04L 25/49*    (2006.01)
    *H04L 25/03*    (2006.01)
    *H04L 25/497*   (2006.01)
    *H04B 7/0456*   (2017.01)
    *H04L 12/26*    (2006.01)

(52) U.S. Cl.
    CPC .......... *H04L 25/497* (2013.01); *H04L 43/028* (2013.01); *H04L 25/03834* (2013.01)

(58) Field of Classification Search
    USPC ................................ 375/340, 346, 347, 348
    See application file for complete search history.

(56)            References Cited

U.S. PATENT DOCUMENTS

| | | | |
|---|---|---|---|
| 2007/0147476 A1* | 6/2007 | Merz ................. | H04B 1/71632 375/130 |
| 2009/0252259 A1* | 10/2009 | Ikeda ................. | H04B 1/71637 375/340 |
| 2011/0188550 A1 | 8/2011 | Wajcer et al. | |
| 2015/0110216 A1* | 4/2015 | Bajcsy ................... | H04B 1/40 375/285 |
| 2016/0269195 A1* | 9/2016 | Coenen ................ | H02J 7/0014 |

OTHER PUBLICATIONS

Kim et al. "On Spectrum Broadening of Pre-coded Faster-than-Nyquist Signaling" Vehicular Technology Conference Fall (VTC 2010—Fall), IEEE, 5 pages.

* cited by examiner

PRECODING IN FASTER-THAN-NYQUIST COMMUNICATIONS

CROSS REFERENCE TO RELATED APPLICATION(S)

This application is a 35 U.S.C. §371 National Phase Entry Application from PCT/EP2015/053442, filed Feb. 18, 2015, designating the United States, the disclosure of which is incorporated herein in its entirety by reference.

TECHNICAL FIELD

Embodiments presented herein relate to precoding (and postcoding), and particularly to methods, a transmitter, a receiver, computer programs, and a computer program product for precoding (and postcoding) in a faster-than-Nyquist communications.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is bandwidth. The bandwidth limits the information rate of a communication system and is a limited resource, hence it should be used efficiently. For this reason, faster-than-Nyquist (FTN) signaling has attracted interest as it enables a higher data rate (in comparison to schemes not using FTN signaling) without increasing the bandwidth, either by performing spectral compression or by transmitting pulses with a given time-domain shape at a rate that violates Nyquist's intersymbol interference (ISI) criterion. Since the pioneering work by Saltzberg ("Intersymbol interference error bounds with application to ideal bandlimited signaling," IEEE Transactions on Information Theory, vol. 14, no. 4, pp. 563-568, 1968) and by Mazo ("Faster-than-Nyquist signaling," Bell System Technical Journal, vol. 54, no. 8, pp. 1451-1462, 1975) researchers have been investigating the performance limits of FTN and methods for practical implementation.

FTN has traditionally required the use of the Viterbi algorithm for reliable decoding, an approach whose complexity grows exponentially with the number of interfering symbols and polynomially with the number of points in the signal constellation. As an example, decoding a M-PAM (where PAM is short for pulse-amplitude modulation) signal with N symbols and an effect of ISI lasting K symbols results in a computational complexity of $O(N \cdot M^K)$. For large K and/or M this algorithm becomes impractical to be used.

Using the Viterbi algorithm for data decisions in the presence of ISI is thus computationally demanding if the modulation order is high (i.e., the value of M is large) and/or there is ISI interaction between many symbols (i.e., the value of K is large).

An FTN scheme has been proposed which is not based on the Viterbi algorithm and instead uses precoding in the transmitter and a postcoding in the receiver to allow for optimal data decisions in the presence of ISI. This FTN scheme operates on a block of N data symbols and uses the inverse square root of the Gram matrix of the communication channel to precode the symbol amplitudes in the transmitter and perform postcoding in the receiver after matched filtering. The computational complexity of the pre- and postcoding operations is $O(N^2)$ regardless of the number of constellation points (i.e., regardless of M) and calculating the pre/postcoding matrix has a computational complexity of $O(N^3)$. This FTN scheme requires storing the N×N coding matrix on which the Gram matrix is based in both the transmitter and the receiver (although the actual number of elements to be stored is closer to $N^2/2$ due to symmetry properties of the N×N coding matrix).

However, the above disclosed PIN scheme based on precoding and postcoding requires a computationally demanding inversion of the square root of the channel Gram matrix which has $O(N^3)$ complexity and can be difficult to perform on the fly if the FTN parameters has to be changed. This could be the case if, e.g., the channel conditions change to become more/less demanding. Furthermore, according to the above disclosed FTN scheme the precoding is applied as a matrix multiplication on the complete block of data to be transmitted. This makes the above disclosed FIN scheme unfeasible for transmitting long data sequences, such as data sequences containing thousands or more information bits. Further, the large matrix would consume a lot of memory in both the transmitter and the receiver.

Hence, there is still a need for an improved precoding (and postcoding) for faster-than-Nyquist communications.

SUMMARY

An object of embodiments herein is to provide efficient precoding (and postcoding) for faster-than-Nyquist communications.

According to a first aspect there is presented a method for processing a set of input symbols. The method is performed by a transmitter. The method comprises acquiring a set of input symbols. The method comprises generating a set of precoded symbols from the set of input symbols by subjecting the set of input symbols to a coding vector. The method comprises generating a transmission signal comprising a sequence of pulse forms from the set of precoded symbols by pulse shaping the set of precoded symbols. The coding vector is based on a model vector modelling intersymbol interference experienced by the pulse forms.

Advantageously this provides efficient precoding (and enables efficient postcoding) for faster-than-Nyquist communications.

Advantageously, the computational complexity for calculating the coding vector for N symbols is only $O(N \log_2(N))$ and requires storage of only a single vector in the transmitter (and the receiver), as opposed to a large matrix as needed in the above disclosed FTN scheme.

According to a second aspect there is presented a transmitter for processing a set of input symbols. The transmitter comprises a processing unit. The processing unit is configured to cause the transmitter to acquire a set of input symbols. The processing unit is configured to cause the transmitter to generate a set of precoded symbols from the set of input symbols by subjecting the set of input symbols to a coding vector. The processing unit is configured to cause the transmitter to generate a transmission signal comprising a sequence of pulse forms from the set of precoded symbols by pulse shaping the set of precoded symbols. The coding vector is based on a model vector modelling intersymbol interference experienced by the pulse forms.

According to a third aspect there is presented a computer program for processing a set of input symbols, the computer program comprising computer program code which, when run on a processing unit of a transmitter, causes the transmitter to perform a method according to the first aspect.

According to a fourth aspect there is presented a method for processing a reception signal. The method is performed by a receiver. The method comprises receiving a reception signal representing a set of input symbols, the reception signal comprising a sequence of pulse forms. The method comprises generating a set of sampled symbols by subjecting the reception signal to a matched receiver filter. The method comprises generating a set of decoded symbols from the set of sampled symbols by subjecting the set of sampled symbols to a coding vector. The coding vector is based on a model vector modelling intersymbol interference experienced by the pulse forms.

According to a fifth aspect there is presented a receiver for processing a reception signal. The receiver comprises a processing unit. The processing unit is configured to cause the receiver to receive a reception signal representing a set of input symbols, the reception signal comprising a sequence of pulse forms. The processing unit is configured to cause the receiver to generate a set of sampled symbols by subjecting the reception signal to a matched receiver filter. The processing unit is configured to cause the receiver to generate a set of decoded symbols from the set of sampled symbols by subjecting the set of sampled symbols to a coding vector. The coding vector is based on a model vector modelling intersymbol interference experienced by the pulse forms.

According to a sixth aspect there is presented a computer program for processing a reception signal, the computer program comprising computer program code which, when run on a processing unit of a receiver, causes the receiver to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
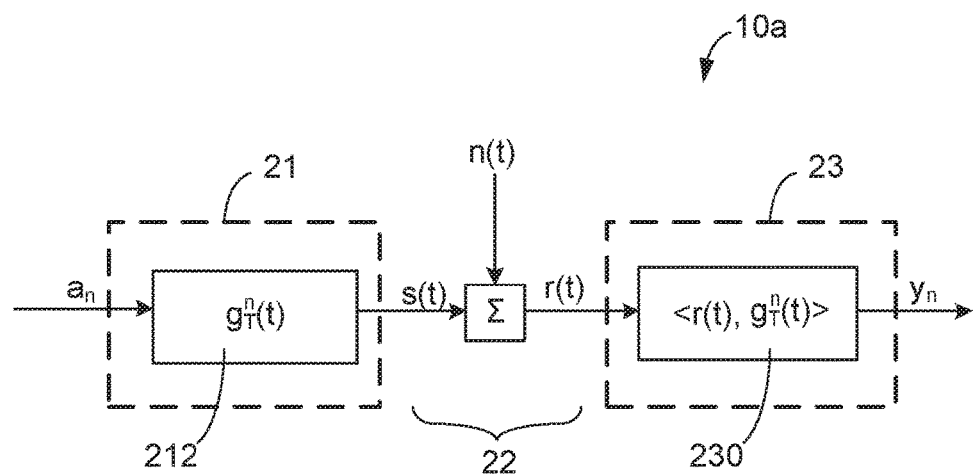
FIG. 1 is a schematic diagram illustrating a communication network boa according to prior art.

FIG. 1 is a schematic diagram illustrating a known communications network boa. The communications network boa comprises a transmitter 21 and a receiver 23 separated by a transmission channel 22.

At the transmission channel 22, additive white Gaussian noise (AWGN), denoted w(t), is added to the signal s(t) transmitted by the transmitter 21. Hence, the signal r(t) received by the receiver 23 may be written as r(t)=s(t)+w(t), (in vector notation: r=s+w) where t is a time index, and where w(t) is a continuous stationary stochastic process with zero mean and two-sided power spectral density $N_0/2$ per dimension. The AWGN model is thus assumed, which is accurate in many scenarios in spite of its simplicity. The symbols an are pulse-shaped in the transmitter 21 by a pulse filter 212 and together form the signal s(t). The pulse filter 212 can be regarded as digital-to-analog converter generating a (physical) transmission signal s(t) based on a set of digital values or symbols $a_n$. Vice versa, the matched filter 230 can be to regarded as analog-to-digital converter generating a set of digital values or symbols $y_n$ based on a received (physical) signal r(t).

Root-raised cosine (RRC) pulses enable ISI free transmission provided they are sent with a pulse repetition frequency of 1/T, where T is the inverse symbol rate, and that a matched filter 230 is used in the receiver 23. Other pulse shapes may be used as well, at the cost of some residual ISI after detection, regardless of if FTN is used or not. Sending the RRC pulses at the rate 1/T is known as orthogonal signaling, since the pulses are orthogonal to each other, i.e. the inner product of two different pulses is zero.

Discrete output samples $y_n$ are at the receiver 23 obtained after matched filtering followed by optimal (in the sense that the number of bit errors is minimized) sampling. The process of filtering and sampling is equivalent to calculating the inner products of the signal pulses and the RRC filter:

$$y_n = \langle r(t), g_T(t - n \cdot T) \rangle$$

$$= \langle s(t), g_T(t-n \cdot T) \rangle + \langle w(t), g_T(t-n \cdot T) \rangle$$

$$= \sum_m a_m \langle g_T(t-m \cdot T), g_T(t-n \cdot T) \rangle + \eta_n$$

$$= \{\text{orthogonality}\}$$

$$= a_n + \eta_n,$$

where n is the index of the n:th symbol, m the index of the m:th sampling instant, where $g_T$ is the RRC pulse shape and $\eta_n$ is zero mean and Gaussian.

Given the set of samples $y_n$ computed by using a matched filter, the overall transmission problem may be formulated as to estimate set of symbols $a_n$ from the samples $y_n$ with as low probability of error as possible.

For orthogonal pulses $y_n$ are not affected by ISI and since the noise is white, it is sufficient to consider the amplitude of one symbol at a time to perform maximum likelihood detection of the transmitted bits at the receiver 23.

FTN signaling is accomplished by instead transmitting:

$$s(t) = \sum_n a_n g_T(t-n \cdot \rho T),$$

where $\rho < 1$ ($\rho = 1$ yields orthogonal pulses), and where $g_T(t-n \cdot \rho T)$ is the FTN pulse shape. The FTN pulse shape may be normalized with the square root of $\rho$ to not increase the power transmitted by the transmitter 21 (the matched filter 230 at the receiver 23 is corrected accordingly). The symbols $a_n$ may be taken from a finite alphabet A.

As a consequence, the pulses are no longer orthogonal (ISI is introduced) and the noise in the receiver 23 becomes correlated. This causes a signal to noise ratio (SNR) penalty in the receiver 23 if data decisions are made on a symbol-by-symbol basis; higher SNR is required to achieve a given bit error rate (BER). The limitation on the FTN parameter $\rho$ which determines the gain in data rate for the FTN signal over orthogonal transmission is $(1+\beta)>\rho$, where $\beta$ is the excess bandwidth of the RRC pulses. Using $\beta=0$ is not possible in practical communications systems. Common values are $\beta=0.1-0.3$. In, e.g., the 3rd Generation Partnership Project (3GGP) telecommunications standards RRC pulses with $\beta=0.22$ are used.

The discrete output symbols are:

$$y_n = \langle r(t), g_T^n(t) \rangle = \sum_{m=1}^{N} a_m \cdot \underbrace{\langle g_T^m(t), g_T^n(t) \rangle}_{G_{m,n}} + \underbrace{\langle w(t), g_T^n(t) \rangle}_{w_n}, n = 1, \ldots, N$$

which in vector form can be expressed as:

$$y = Ga + G^{1/2}\eta = Ga + w.$$

The matrix G is known as a Gram matrix, and w represents independent, identically distributed (IID), zero-mean, Gaussian noise. The matrix G has properties connected to the pulses used in sending and receiving. To calculate an element $G_{mn}$ of G the inner product between the m:th pulse and the matched filter 230 is calculated at sampling instant n. For orthogonal signaling the Gram matrix is diagonal (implying there is no correlation between the data symbols or the noise) but not for $\rho < 1$, which complicates the data decision process unless the performance is allowed to be degraded.

The inverse square-root of the Gram matrix may be utilized to mitigate the ISI introduced by FTN transmission. Such a scheme may be referred to as Gram-to-minus-half (GTMH) precoding. The precoded symbols are obtained by multiplying the symbol amplitudes with the GTMH matrix (i.e., $G^{-1/2}$) as follows:

$$\hat{a} = G^{-1/2} a,$$

which in the receiver 23 yields the signal:

$$y = G^{1/2}(G^{1/2}\hat{a}+\eta) = G^{1/2}(a+\eta),$$

Postcoding with the GTMH matrix $G^{-1/2}$ then yields:

$$\hat{y} = G^{-1/2} y = a+\eta,$$

on which decisions in the receiver 23 can be made which are not influenced by ISI or noise correlation. $G^{-1/2}$ is obtained by singular value decomposition, which has $O(N^3)$ complexity for a block of N symbols. It has been proposed that the precoding needs to be applied on the complete symbol block to be transmitted. Thus, the inverse square root of the Gram matrix is used for precoding in the transmitter 12 and for postcoding in the receiver 23. This implies that a unique filter is used for precoding and postcoding of each data symbol. This is not feasible, and as will be further disclosed below, and is not necessary.

The embodiments disclosed herein thus relate to efficient precoding (and postcoding) in a faster-than-Nyquist communications. In order to obtain such precoding there is provided a transmitter 21, a method performed by the transmitter 21, a computer program comprising code, for example in the form of a computer program product, that when run on a processing unit of the transmitter 21, causes the processing unit to perform the method. In order to obtain such postcoding there is further provided a receiver 23, a method performed by the receiver 2, and a computer program comprising code, for example in the form of a computer program product, that when run on a processing unit of the receiver 23, causes the processing unit to perform the method.

Figure 2:
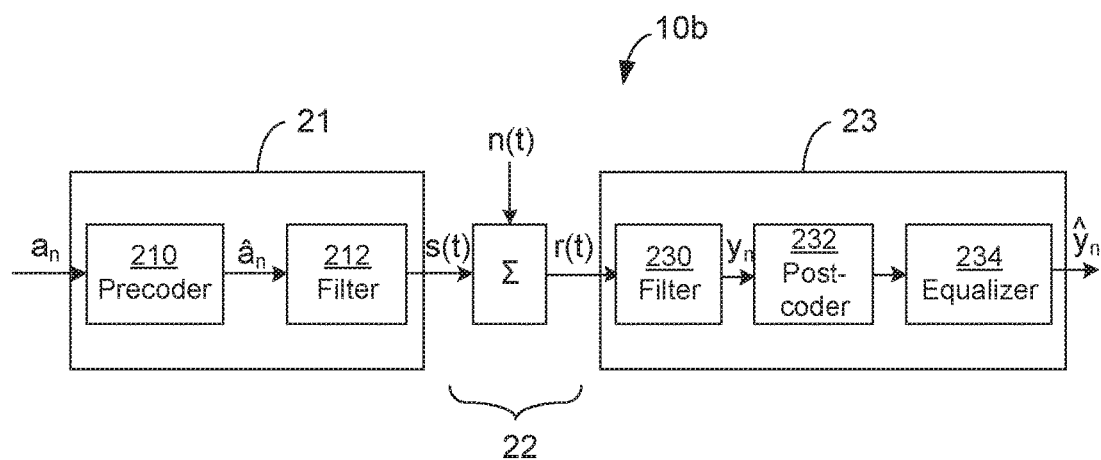
FIG. 2 is a schematic diagram illustrating a communication network 10b according to embodiments.

FIG. 2 is a schematic diagram illustrating a communications network 10b where embodiments presented herein can be applied. The communications network 10b comprises a transmitter 21 and a receiver 23 separated by a transmission channel 22. In comparison to the transmitter 21 of FIG. 1, the transmitter 21 of FIG. 2 further comprises a precoder 210. In comparison to the receiver 23 of FIG. 1, the receiver 23 of FIG. 2 further comprises a postcoder 232 and an adaptive equalizer 234. Further details of the precoder 210, the postcoder 232, and the adaptive equalizer 234 will be disclosed below.

The transmitter 21 and/or receiver 23 may be part of a network node or a wireless device. A network node may comprise both a transmitter 21 and a receiver 23 as herein disclosed. However, a network node may only comprise one of the herein disclosed transmitter 21 and receiver 23. The network node may be a radio access network node such as a radio base station, a base transceiver station, a node B, or an evolved node B. A wireless device may comprise both a transmitter 21 and a receiver 23 as herein disclosed. However, a wireless device may only comprise one of the herein disclosed transmitter 21 and receiver 23. The wireless device may be a mobile station, a mobile phone, a handset, a wireless local loop phone, a user equipment (UE), a smartphone, a laptop computer, a tablet computer, a sensor, or an Internet-of-things device.

Figure 3A:
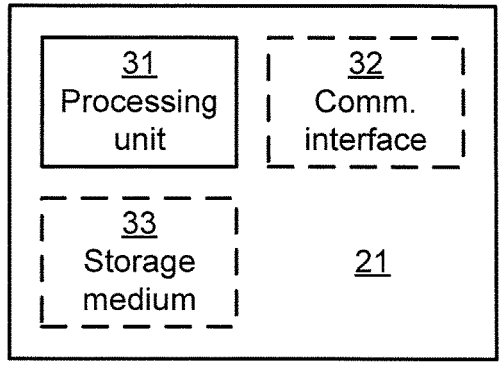
FIG. 3a is a schematic diagram showing functional units of a transmitter according to an embodiment.

FIG. 3a schematically illustrates, in terms of a number of functional units, the components of a transmitter 21 according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 51*a* (as in FIG. 5), e.g. in the form of a storage medium 33. Thus the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The transmitter 21 may further comprise a communications interface 32 for communications with a receiver 23. As such the communications interface 32 may comprise one or more transmitters and receivers, comprising analogue and digital components and a suitable number of antennas for wireless communications and ports for wireline communications. The processing unit 31 controls the general operation of the transmitter 21 e.g. by sending data and control signals to the communications interface 32 and the storage medium 33, by receiving data and reports from the communications interface 32, and by retrieving data and instructions from the storage medium 33. Other components, as well as the related functionality, of the transmitter 21 are omitted in order not to obscure the concepts presented herein.

Figure 3B:
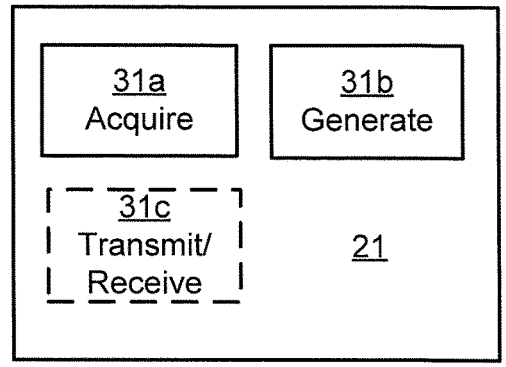
FIG. 3b is a schematic diagram showing functional modules of a transmitter according to an embodiment.

FIG. 3*b* schematically illustrates, in terms of a number of functional modules, the components of a transmitter 21 according to an embodiment. The transmitter 21 of FIG. 3*b* comprises a number of functional modules; an acquire module 31*a* configured to perform below step S102, and a generate module 31*b* configured to perform below steps S104, S106. The transmitter 21 of FIG. 3*b* may further comprises a number of optional functional modules, such as a transmit and/or receive module 31*c* configured to perform below step S108. The functionality of each functional module 31*a-c* will be further disclosed below in the context of which the functional modules 31*a-c* may be used. In general terms, each functional module 31*a-c* may be implemented in hardware or in software. Preferably, one or more or all functional modules 31*a-c* may be implemented by the processing unit 31, possibly in cooperation with functional units 32 and/or 33. The processing unit 31 may thus be arranged to from the storage medium 23 fetch instructions as provided by a functional module 31*a-c* and to execute these instructions, thereby performing any steps as will be disclosed hereinafter.

Figure 4A:
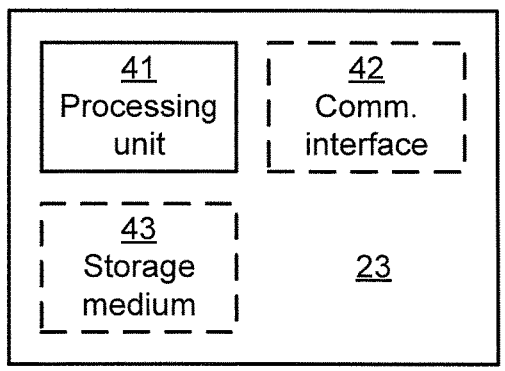
FIG. 4a is a schematic diagram showing functional units of a receiver according to an embodiment.

FIG. 4*a* schematically illustrates, in terms of a number of functional units, the components of a receiver 23 according to an embodiment. A processing unit 41 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 51*b* (as in FIG. 5), e.g. in the form of a storage medium 43. Thus the processing unit 41 is thereby arranged to execute methods as herein disclosed. The storage medium 43 may also comprise persistent storage, which, for example, can be any single one or combination of magnetic memory, optical memory, solid state memory or even remotely mounted memory. The receiver 23 may further comprise a communications interface 42 for communications with a transmitter 21. As such the communications interface 42 may comprise one or more transmitters and receivers, comprising analogue and digital components and a suitable number of antennas for wireless communications and ports for wireline communications. The processing unit 41 controls the general operation of the receiver 23 e.g. by sending data and control signals to the communications interface 42 and the storage medium 43, by receiving data and reports from the communications interface 42, and by retrieving data and instructions from the storage medium 43. Other components, as well as the related functionality, of the receiver 23 are omitted in order not to obscure the concepts presented herein.

Figure 4B:
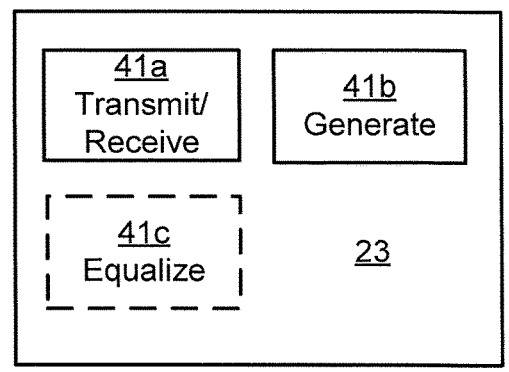
FIG. 4b is a schematic diagram showing functional modules of a receiver according to an embodiment.

FIG. 4*b* schematically illustrates, in terms of a number of functional modules, the components of a receiver 23 according to an embodiment. The receiver 23 of FIG. 4*b* comprises a number of functional modules; a transmit and/or receive module 41*a* configured to perform below step S202, and a generate module 41*b* configured to perform below steps S204, S206. The receiver 23 of FIG. 3*b* may further comprises a number of optional functional modules, such as an equalize module 41*c* configured to perform below step S208. The functionality of each functional module 41*a-bc* will be further disclosed below in the context of which the functional modules 41*a-c* may be used. In general terms, each functional module 41*a-c* may be implemented in hardware or in software. Preferably, one or more or all functional modules 41*a-b* may be implemented by the processing unit 41, possibly in cooperation with functional units 42 and/or 43. The processing unit 41 may thus be arranged to from the storage medium 43 fetch instructions as provided by a functional module 41*a-c* and to execute these instructions, thereby performing any steps as will be disclosed hereinafter.

The transmitter 21 and/or receiver 23 may be provided as a standalone device or as a part of a further device. For example, as noted above, the transmitter 21 and/or receiver 23 may be provided in a network node and/or a wireless device. The transmitter 21 and/or receiver 23 may be provided as an integral part of the network node and/or wireless device. That is, the components of the transmitter 21 and/or receiver 23 may be integrated with other components of the network node and/or wireless device; some components of the transmitter 21 and/or receiver 23 and the network node and/or wireless device may be shared. For example, if the network node and/or wireless device as such comprises a processing unit, this processing unit may be arranged to perform the actions of the processing unit network node and/or wireless device of with the transmitter 21 and/or receiver 23. Alternatively the transmitter 21 and/or receiver 23 may be provided as a separate unit in the network node and/or wireless device.

Figure 5:
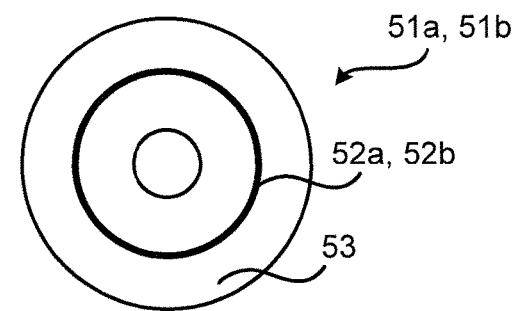
FIG. 5 shows one example of a computer program product comprising computer readable means according to an embodiment.

FIG. 5 shows one example of a computer program product 41*a*, 41*b* comprising computer readable means 53. On this computer readable means 53, a computer program 52*a* can be stored, which computer program 52*a* can cause the processing unit 31 and thereto operatively coupled entities and devices, such as the communications interface 32 and the storage medium 33, to execute methods according to embodiments described herein. The computer program 52*a* and/or computer program product 51*a* may thus provide means for performing any steps of the transmitter 21 as herein disclosed. On this computer readable means 53, a computer program 52*b* can be stored, which computer program 52*b* can cause the processing unit 41 and thereto operatively coupled entities and devices, such as the communications interface 42 and the storage medium 43, to execute methods according to embodiments described herein. The computer program 52*b* and/or computer program product 51b may thus provide means for performing any steps of the receiver 23 as herein disclosed.

In the example of FIG. 5, the computer program product 51a, 51b is illustrated as an optical disc, such as a CD (compact disc) or a DVD (digital versatile disc) or a Blu-Ray disc. The computer program product 51a, 51b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 52a, 52b is here schematically shown as a track on the depicted optical disk, the computer program 52a, 52b can be stored in any way which is suitable for the computer program product 51a, 51b.

Figure 6:
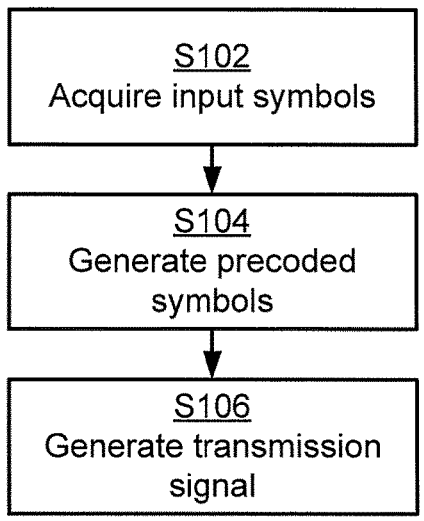
FIGS. 6, 7, 8, and 9 are flowcharts of methods according to embodiments.
Figure 8:
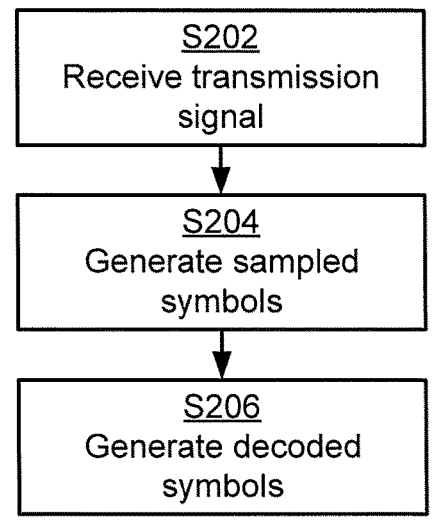
Figure 7:
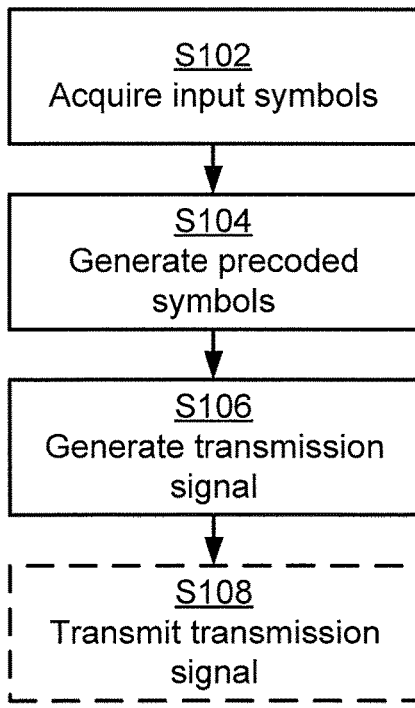
Figure 9:
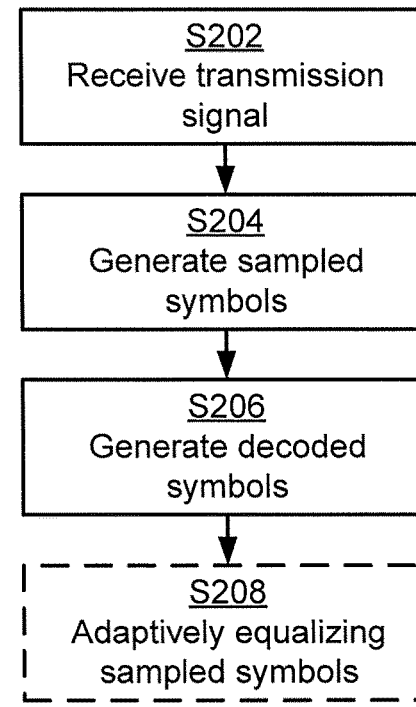

FIGS. 6 and 7 are flow charts illustrating embodiments of methods for processing a set of input symbols a as performed by the transmitter 21. FIGS. 8 and 9 are flow charts illustrating embodiments of methods for processing a reception signal r as performed by the receiver 23. The methods are advantageously provided as computer programs 52a, 52b.

According to at least some of the herein disclosed embodiments, precoding is employed in the transmitter 21 and postcoding is employed in the receiver 23 for FTN signals. As noted above, it has been proposed that the precoding needs to be applied on the complete symbol block to be transmitted. But instead of using the inversion of the square root of the Gram matrix, a single vector can thus be used for precoding and postcoding.

Reference is now made to FIG. 6 illustrating a method for processing a set of input symbols a as performed by the transmitter 21 according to an embodiment.

The transmitter 21 is configured to processing a set of input symbols a. Therefore, the transmitter 21 is configured to, in a step S102, acquire a set of input symbols a.

These input symbols a are by the transmitter 21 used to generate precoded symbols â. Particularly, the transmitter 21 is configured to, in a step S104, generate a set of precoded symbols â from the set of input symbols a. The set of precoded symbols a are generated by subjecting the set of input symbols a to a coding vector $g_{MH}$. In FIG. 2 this is accomplished by the input symbols a being fed to the precoder 210 that generates the precoded symbols â by subjecting the set of input symbols a to the coding vector $g_{MH}$.

A transmission signal s representing the set of input symbols a is then generated. Particularly, the transmitter 21 is configured to, in a step S106, generate a transmission signal s comprising a sequence of pulse forms gT. The transmitter 21 generates the transmission signal s by pulse shaping the set of precoded symbols â. In FIG. 2 this is accomplished by the precoded symbols â being fed to the pulse filter 212 that generates a transmission signal s by pulse shaping the set of precoded symbols â.

The coding vector $g_{MH}$ is based on a model vector $g_{ISI}$ modelling intersymbol interference experienced by the pulse forms gT.

While the previously summarized approach for precoding and postcoding can be regarded as using a unique filter for each symbol in a data block to mitigate ISI, the inventive concept as proposed herein is thus based on using a single filter for all symbols, which gives significant complexity reduction without causing any performance degradation.

Embodiments relating to further details of processing a set of input symbols a will now be disclosed.

According to an embodiment, subjecting the set of input symbols a to a coding vector $g_{MH}$ comprises determining â as $â = g_{MH}$ a. Hence, the precoder 210 may implement the operations needed to determine â as $â = g_{MH}$ a. Thus, the precoder 210 may be configured to acquire, or determine, $g_{MH}$, and to perform the vector operations needed to determine $â = g_{MH}$ a.

The pulse forms in the sequence of pulse forms gT may be separated by a time distance ρT, where T is an intermediate time for orthogonal pulse transmission with respect to the pulse form gT, and 0<ρ<1 is a scale factor as disclosed above. As noted above, ρ may be determined such as the relation (1+β)ρ>1 holds. There are different values of β that may be used. One example is to use 0.1<β<0.3, but also values of β outside this interval may be used. According to an embodiment β=0.22.

The ISI impact on each transmitted pulse can be accurately modeled by considering only a limited number of pulses transmitted before and afterwards, since the pulse response decays to zero for sufficient deviations in time from the peak. The filter/vector describing the ISI from the neighboring pulses can be found by calculating the inner products of a single pulse and the receiver filter at the sampling instants that would be used for a given pulse/symbol rate.

It is reasonable to account for the same number of pulses before and after the pulse under consideration, and thus N pulses before the pulse under consideration and N pulses after the pulse under consideration may be considered. This interaction happens to be described by the center-most row vector of a Gram matrix of dimension (2N+1)×(2N+1), and provided that N is chosen sufficiently large it will account for all ISI that impacts the performance (in terms of, e.g., the BER). That is, provided N is chosen sufficiently large the performance penalty due to this modification of the FTN scheme as disclosed above using the complete Gram matrix should be negligible, which can be understood from the fact that the pulse response decays to zero when moving away from the central part of the pulse, with a rate which depends on β. This center-most row vector of the Gram matrix is the vector denoted as the model vector $g_{ISI}$. To account symmetrically for ISI to from symbols before and after a pulse the center-most row vector, denoted $g_{ISI}$, in the Gram matrix can thus be utilized when deriving the coding vector.

The coding vector may be obtained by transforming $g_{ISI}$ to the frequency domain by using a fast Fourier transform (FFT).

The inverse of $g_{ISI}$ in the frequency domain may then be determined, and the square root may be taken of the absolute value of each element of the inverted $g_{ISI}$.

An inverse fast Fourier transform (IFFT) is performed to obtain the precoding filter defining the coding vector $g_{MH}$ in the time domain, where MH denotes "minus half". That is, the coding vector $g_{MH}$ may be determined from the model vector $g_{ISI}$ according to:

$$g_{MH} = IFFT(\sqrt{|FFT(g_{ISI})^{-1}|})$$

This coding vector $g_{MH}$ is then used for precoding and postcoding as follows:

$$â_k = g_{MH} \{a_{k-N}, \ldots a_{k+N}\}^T.$$

The coding vector $g_{MH}$ can be calculated with an FFT with complexity of only $O((2N+1)\log_2(2N+1))$ when accounting for ISI between 2N+1 symbols.

A filter for mitigating the effects of the ISI is thus given by the $g_{MH}$ vector used for precoding in the transmitter 21 and postcoding in the receiver 23.

The vector $g_{MH}$ thus replaces the inverse square-root of the Gram matrix and can be obtained by singular-value decomposition with a complexity of $O(N^2)$ when applied on N pulses.

That is, this approach does not require obtaining the whole G matrix; it is sufficient to calculate only the inner products of a single pulse and the matched filter. Particularly, according to an embodiment the model vector $g_{ISI}$ is defined by the inner product of one pulse form in the sequence of pulse forms gT and coefficients of a matched filter which is matched to the sequence of pulse forms. The inner products may be taken at the sampling instants which corresponds to the FTN symbol period (i.e. integer multiples of $\pm\rho T$). Particularly, according to an embodiment the inner product is calculated at integer multiples of $\pm\rho T$, where T is an intermediate time for orthogonal pulse transmission with respect to the pulse form gT, and $0<\rho<1$ is a scale factor as noted above.

The model vector $g_{ISI}$ obtained in this manner then accurately models the ISI experienced by the pulses of an FTN signal.

Taking the negative square root of the inverse of this vector enables a pre- and postcoding scheme similar to the GTMH scheme using whole G matrix but with significantly reduced complexity. That is, according to an embodiment the coding vector $g_{MH}$ is based on the negative square root of the model vector $g_{ISI}$.

It may not be necessary to consider all the N symbols in a data block/frame when determining the coding vector $g_{MH}$; the coding vector $g_{MH}$ can be truncated with negligible performance loss in most practical cases. Hence, the coding vector $g_{MH}$ may be reduced from having a length $L_1=(2N+1)$ to a having a length $L_2<L_1$, where $L_2$ could be in the order of about 10 symbol periods. In general terms, the number of symbol periods $L_2$ to be covered by the coding vector $g_{MH}$ may depend on the truncating time for the used pulses (e.g., to take into consideration how many adjacent pulses a certain pulse will overlap).

As noted above, the model vector $g_{ISI}$ may be determined from the whole Gram matrix G. Hence, according to an embodiment the model vector $g_{ISI}$ is defined by the centermost row vector of the Gram matrix G of the set of input symbols a. The Gram matrix G may be defined by the inner product of all pulse forms in the sequence of pulse forms gT and coefficients of a matched filter which is matched to the sequence of pulse forms.

Reference is now made to FIG. 7 illustrating methods for processing a set of input symbols a as performed by the transmitter 21 according to further embodiments.

The transmitter 21 may transmit the generated transmission signal s over a transmission channel 22 to the receiver 23. Hence, according to an embodiment the transmitter 21 is configured to, in a step S108, transmit the transmission signal s.

As disclosed above, the transmission signal s is by the communications channel 22 affected by noise, resulting in a reception signal r, being received by the receiver 23. How the receiver 23 may process the reception signal r will be disclosed next.

Reference is now made to FIG. 8 illustrating a method for processing a reception signal r as performed by the receiver 23 according to an embodiment.

The receiver 23 is configured to process a reception signal r. In order to do so the receiver 23 is configured to, in a step S202, receive a reception signal r. The reception signal r represents a set of input symbols a. The reception signal r comprises a sequence of pulse forms gT.

Sampled symbols y are then obtained from the reception signal r. Particularly, the receiver 23 is configured to, in a step S204, generate a set of sampled symbols y by subjecting the reception signal r to a matched receiver filter 230. Thus, in FIG. 2 this is accomplished by the reception signal r being fed to the matched filter 230 that generates the sampled symbols y by subjecting the reception signal r to the matched filter.

Decoded symbols ŷ are then obtained from the sampled symbols y. The decoded symbols ŷ thus represent the receiver's 23 version of the set of input symbols a. The receiver 23 is configured to, in a step S206, generate a set of decoded symbols ŷ from the set of sampled symbols y by subjecting the set of sampled symbols y to a coding vector $g_{MH}$. The coding vector $g_{MH}$ is based on a model vector $g_{ISI}$ modelling intersymbol interference experienced by the pulse forms gT. In FIG. 2 this is accomplished by the sampled symbols y being fed to the postcoder 232 that generates the decoded symbols ŷ by subjecting the set of sampled symbols y to a coding vector $g_{MH}$.

Embodiments relating to further details of processing a reception signal r will now be disclosed.

According to an embodiment, subjecting the set of sampled symbols y to a coding vector $g_{MH}$ comprises determining ŷ as $\hat{y}=g_{MH} y$. Hence, the postcoder 232 may implement the operations needed to determine ŷ as $\hat{y}=g_{MH} y$. Thus, the postcoder 232 may be configured to acquire, or determine, $g_{MH}$, and to perform the vector operations needed to determine $\hat{y}=g_{MH} y$. A maximum-likelihood (ML) estimation may be applied to ŷ, e.g. using any known estimation algorithm for the ISI-free case.

As disclosed above, the coding vector $g_{MH}$ may be based on the negative square root of the model vector $g_{ISI}$. As disclosed above, the coding vector $g_{MH}$ may be determined from the model vector $g_{ISI}$ according to:

$$g_{MH}=\text{IFFT}(\sqrt{|\text{FFT}(g_{ISI})^{-1}|}).$$

As disclosed above, the model vector $g_{ISI}$ may be defined by the inner product of one pulse form in the sequence of pulse forms gT and coefficients of a matched filter which is matched to the sequence of pulse forms. The inner product may be calculated at integer multiples of $\pm\rho T$, where T is an intermediate time for orthogonal pulse transmission with respect to the pulse form gT, and $0<\rho<1$ is a scale factor.

As disclosed above, pulse forms in the sequence of pulse forms may be separated by a time distance $\rho T$, where T is an intermediate time for orthogonal pulse transmission with respect to the pulse form gT, and $0<\rho<1$ is a scale factor. As disclosed above, $\rho$ may be determined such as $(1+\beta)\rho>1$, where $0.1<\beta<0.3$, but also other values of $\beta$ are possible. As disclosed above, according to an embodiment, $\beta=0.22$.

Reference is now made to FIG. 9 illustrating methods for processing a reception signal r as performed by the receiver 23 according to further embodiments.

The set of sampled symbols y may be used as input to an adaptive equalizer 234. Hence, according to an embodiment the receiver 23 is configured to, in a step S208, subject S208 the set of sampled symbols y to an adaptive equalizer 234. Thus, in FIG. 2 this is accomplished by the decoded symbols ŷ being fed to the adaptive equalizer 234. The set of sampled symbols y may be subjected to the adaptive equalizer 234 after having been subjected to the coding vector $g_{MH}$. Step S208 may thus be regarded as part of step S206.

The herein proposed method for processing a set of input symbols a may further reduce the complexity in the receiver 23 by omitting the postcoder 232, since the postcoding and matched filtering in the receiver 23 can be implemented by a fractionally-spaced adaptive equalizer 234 with very little performance loss, or even without any performance loss. Hence, if the postcoder 232 is removed the receiver 23 may rely only on adaptive equalization. Using an adaptive equalizer 234 does not imply any additional complexity since it is already commonly used in receivers 23 to mitigate impacts of changes in channel response. Omitting the postcoder 232 may, however, imply that a larger number of equalizer taps is to be used, compared to when both the adaptive equalizer 234 and the postcoder 232 is employed since the postcoder 232, when present, mitigates the ISI from pulses outside the reach of the adaptive equalizer response.

Hence, a transmitter 21 employing precoding as herein disclosed does not need to transmit a transmission signal s to a receiver 23 employing postcoding as herein disclosed. Thus, a transmitter 21 employing precoding as herein disclosed does not rely on being paired with a receiver 23 employing postcoding as herein disclosed. In contrast, a receiver 23 employing postcoding as herein disclosed is dependent on receiving a reception signal based on a transmission signal having been precoded by a transmitter 21 employing precoding as herein disclosed.

Figure 10:
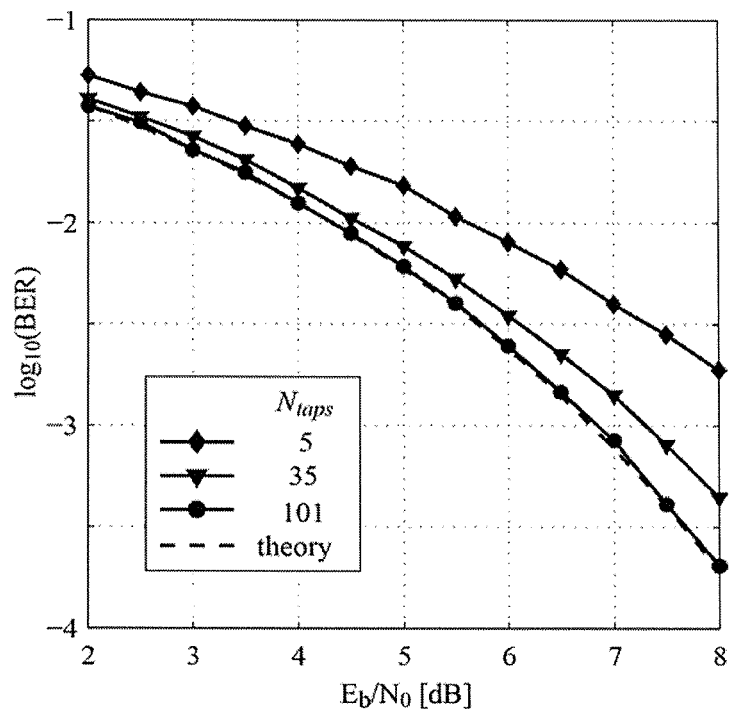
FIGS. 10, 11, and 12 show simulation results according to embodiments.

A performance illustration of the proposed methods for processing a set of input symbols a and for processing a reception signal r is shown in FIG. 10. FIG. 10 provides simulation results of BER versus SNR for Quadrature Phase Shift Keying (QPSK) for different $g_{MH}$ filter lengths. The exact BER in the presence of AWGN for orthogonal transmission is included as well. In the simulations an example excess bandwidth of the RRC pulses of β=0.22 and an FTN parameter of β=0.83 were used. In the plots the $g_{MH}$ filter lengths ($N_{taps}$) ranges from 5 symbols to 101 symbols and for N=50 (2N+1=101) there is no noticeable degradation compared to the performance limit for orthogonal pulses. Simulations were performed for higher order Quadrature amplitude modulation (QAM) formats as well and even for 1024-QAM there is no observable degradation with respect to the theoretical limit.

Figure 11:
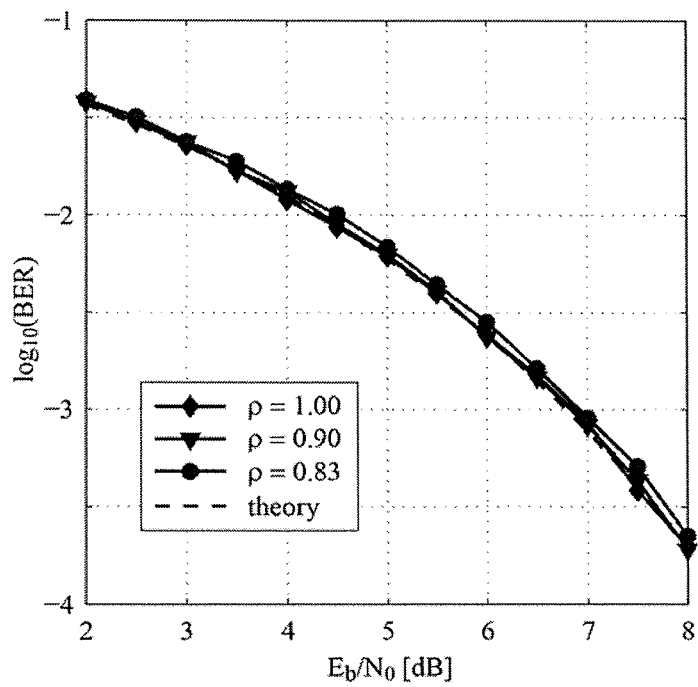

FIG. 11 illustrates BER versus SNR per bit for QPSK for different FTN rates (i.e., different values of ρ). In FIG. 11 the postcoding in the receiver 23 is omitted; only an adaptive equalizer 234 updated with the constant modulus algorithm (CMA) is used. An adaptive equalizer 234 with 21 T/2-spaced taps initialized with a delta function is used. Still, the performance is very close to the theoretical performance limit in the presence of AWGN; the difference is only about 0.1 dB and would be reduced by using more taps in the adaptive equalizer 234 to mitigate more ISI.

Figure 12:
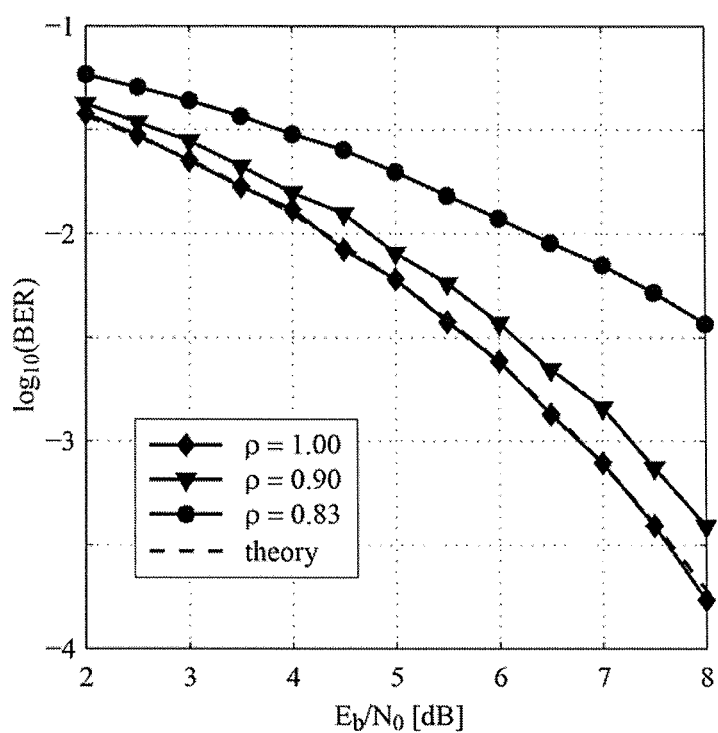

FIG. 12 illustrates BER versus SNR per bit for QPSK for different FTN rates (i.e., different values of ρ) where both precoding and postcoding have been omitted. The results clearly illustrate the importance of the precoding to achieve good performance, as there is a large deviation from the exact BER for the higher FTN rates (i.e., smaller values of ρ).

In summary, according to at least some of the herein disclosed embodiments there has been presented methods for processing a set of input symbols a and for processing a reception signal r which use a filter for pre- and postcoding which can be calculated with O(N log₂(N)) computational complexity when accounting for ISI between N symbols, and only requires a storage of K+1 elements in the transmitter 21 and the receiver 23, where 2K+1=N. This yields a significant reduction in complexity compared to a similar existing schemes for FTN signaling, without any performance degradation.

As noted above, when using the complete Gram matrix G the precoded symbols â are obtained by multiplying the symbol amplitudes a with $G^{-1/2}$, and the decoded symbols ŷ are obtained from the sampled symbols y by multiplying the sampled symbols y with $G^{-1/2}$. When only a vector $g_{MH}$ is used for precoding and postcoding, this vector $g_{MH}$, as herein referred to as the coding vector, takes the role of $G^{-1/2}$. As disclosed above, the coding vector $g_{MH}$ is based on a modelling vector $g_{ISI}$, where $g_{ISI}$ takes the role of G.

The postcoding operation in the receiver 23 can be omitted in some scenarios with very small performance degradation if an adaptive equalizer 234 is used.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for processing a set of input symbols a, the method being performed by a transmitter, the method comprising:
   acquiring a set of input symbols a;
   employing precoding to generate a set of precoded symbols â from the set of input symbols a, wherein employing precoding to generate the set of precoded symbols â comprises subjecting the set of input symbols a to a coding vector $g_{MH}$,
   generating a transmission signal s comprising a sequence of pulse forms gT from the set of precoded symbols â by pulse shaping the set of precoded symbols â; and
   transmitting the transmission signal;
   wherein the coding vector $g_{MH}$ is based on a model vector $g_{ISI}$ modelling intersymbol interference experienced by the pulse forms gT,
   wherein the pulse forms in the sequence of pulse forms are separated by a time distance ρT, where T is an intermediate time for orthogonal pulse transmission with respect to the pulse forms gT, and 0<ρ<1 is a scale factor.

2. The method according to claim 1, wherein â=$g_{MH}$ a.

3. The method according to claim 1, wherein the coding vector $g_{MH}$ is based on the negative square root of the model vector $g_{ISI}$.

4. The method according to claim 1, wherein the coding vector $g_{MH}$ is determined from the model vector $g_{ISI}$ according to:

$$g_{MH} = \mathrm{IFFT}(\sqrt{|\mathrm{FFT}(g_{ISI})^{-1}|})$$

where FFT and IFFT denote Fast Fourier Transform and Inverse Fourier Transform, respectively.

5. The method according to claim 1, wherein the model vector $g_{ISI}$ is defined by the inner product of one pulse form in the sequence of pulse forms gT and coefficients of a matched filter which is matched to the sequence of pulse forms.

6. The method according to claim 5, wherein the inner product is calculated at integer multiples of ±ρT, where T is an intermediate time for orthogonal pulse transmission with respect to the pulse form gT, and 0<ρ<1 is a scale factor.

7. The method according to claim 1, wherein the model vector $g_{ISI}$ is defined by the center-most row vector of a Gram matrix G of the set of input symbols a.

8. The method according to claim 7, wherein the Gram matrix G is defined by the inner product of all pulse forms in the sequence of pulse forms gT and coefficients of a matched filter which is matched to the sequence of pulse forms.

9. The method according to claim 1, wherein ρ is determined such as $(1+\beta)\rho > 1$, where $0.1 < \beta < 0.3$.

10. The method according to claim 9, wherein $\beta = 0.22$.

11. A method for processing a reception signal r, the method being performed by a receiver, the method comprising:
   receiving a reception signal r representing a set of input symbols a, the reception signal comprising a sequence of pulse forms gT;
   generating a set of sampled symbols y by subjecting the reception signal r to a matched receiver filter; and
   generating a set of decoded symbols ŷ from the set of sampled symbols y by subjecting the set of sampled symbols y to a coding vector $g_{MH}$;
   wherein the coding vector $g_{MH}$ is based on a model vector $g_{ISI}$ modelling intersymbol interference experienced by the pulse forms gT,
   wherein the pulse forms in the sequence of pulse forms are separated by a time distance ρT, where T is an intermediate time for orthogonal pulse transmission with respect to the pulse forms gT, and $0 < \rho < 1$ is a scale factor.

12. The method according to claim 11, wherein $\hat{y} = g_{MH} y$.

13. The method according to claim 11, wherein generating the set of decoded symbols ŷ further comprises:
   subjecting the set of sampled symbols y, after having been subjected to the coding vector $g_{MH}$, to an adaptive equalizer.

14. The method according to claim 11, wherein the coding vector $g_{MH}$ is based on the negative square root of the model vector $g_{ISI}$.

15. The method according to claim 11, wherein the coding vector $g_{MH}$ is determined from the model vector $g_{ISI}$ according to:

$$g_{MH} = \text{IFFT}(\sqrt{|\text{FFT}(g_{ISI})^{-1}|})$$

where FFT and IFFT denote Fast Fourier Transform and Inverse Fourier Transform, respectively.

16. The method according to claim 11, wherein the model vector $g_{ISI}$ is defined by the inner product of one pulse form in the sequence of pulse forms gT and coefficients of a matched filter which is matched to the sequence of pulse forms.

17. The method according to claim 16, wherein the inner product is calculated at integer multiples of ±ρT, where T is an intermediate time for orthogonal pulse transmission with respect to the pulse form gT, and $0 < \rho < 1$ is a scale factor.

18. The method according to claim 11, wherein ρ is determined such as $(1+\beta)\rho > 1$, where $0.1 < \beta < 0.3$.

19. The method according to claim 18, wherein $\beta = 0.22$.

20. A transmitter for processing a set of input symbols a, the transmitter comprising a processor configured to cause the transmitter to:
   acquire a set of input symbols a;
   employ precoding to generate a set of precoded symbols â from the set of input symbols a, wherein employing precoding to generate the set of precoded symbols â comprises subjecting the set of input symbols a to a coding vector $g_{MH}$;
   generate a transmission signal s comprising a sequence of pulse forms gT from the set of precoded symbols â by pulse shaping the set of precoded symbols â; and
   transmit the transmission signal;
   wherein the coding vector $g_{MH}$ is based on a model vector $g_{ISI}$ modelling intersymbol interference experienced by the pulse forms gT,
   wherein the pulse forms in the sequence of pulse forms are separated by a time distance ρT, where T is an intermediate time for orthogonal pulse transmission with respect to the pulse forms gT, and $0 < \rho < 1$ is a scale factor.

21. A receiver for processing a reception signal r, the receiver comprising a processor configured to cause the receiver to:
   receive a reception signal r representing a set of input symbols a, the reception signal comprising a sequence of pulse forms gT;
   generate a set of sampled symbols y by subjecting the reception signal r to a matched receiver filter; and
   generate a set of decoded symbols ŷ from the set of sampled symbols y by subjecting the set of sampled symbols y to a coding vector $g_{MH}$;
   wherein the coding vector $g_{MH}$ is based on a model vector $g_{ISI}$ modelling intersymbol interference experienced by the pulse forms gT,
   wherein the pulse forms in the sequence of pulse forms are separated by a time distance ρT, where T is an intermediate time for orthogonal pulse transmission with respect to the pulse forms gT, and $0 < \rho < 1$ is a scale factor.

22. A non-transitory computer readable medium storing computer code for processing a set of input symbols a, the computer code being executable by a processor to cause the processor to:
   acquire a set of input symbols a;
   employ precoding to generate a set of precoded symbols â from the set of input symbols a, wherein employing precoding to generate the set of precoded symbols â comprises subjecting the set of input symbols a to a coding vector $g_{MH}$;
   generate a transmission signal s comprising a sequence of pulse forms gT from the set of precoded symbols â by pulse shaping the set of precoded symbols â; and
   transmit the transmission signal;
   wherein the coding vector $g_{MH}$ is based on a model vector $g_{ISI}$ modelling intersymbol interference experienced by the pulse forms gT,
   wherein the pulse forms in the sequence of pulse forms are separated by a time distance ρT, where T is an intermediate time for orthogonal pulse transmission with respect to the pulse forms gT, and $0 < \rho < 1$ is a scale factor.

23. A non-transitory computer readable medium storing computer code for processing a reception signal r, the computer code being executable by a processor to cause the processor to:
   receive a reception signal r representing a set of input symbols a, the reception signal comprising a sequence of pulse forms gT;
   generate a set of sampled symbols y by subjecting the reception signal r to a matched receiver filter; and
   generate a set of decoded symbols ŷ from the set of sampled symbols y by subjecting the set of sampled symbols y to a coding vector $g_{MH}$;
   wherein the coding vector $g_{MH}$ is based on a model vector $g_{ISI}$ modelling intersymbol interference experienced by the pulse forms gT,
   wherein the pulse forms in the sequence of pulse forms are separated by a time distance ρT, where T is an intermediate time for orthogonal pulse transmission with respect to the pulse forms gT, and $0<\rho<1$ is a scale factor.

\* \* \* \* \*